Patented Oct. 28, 1930

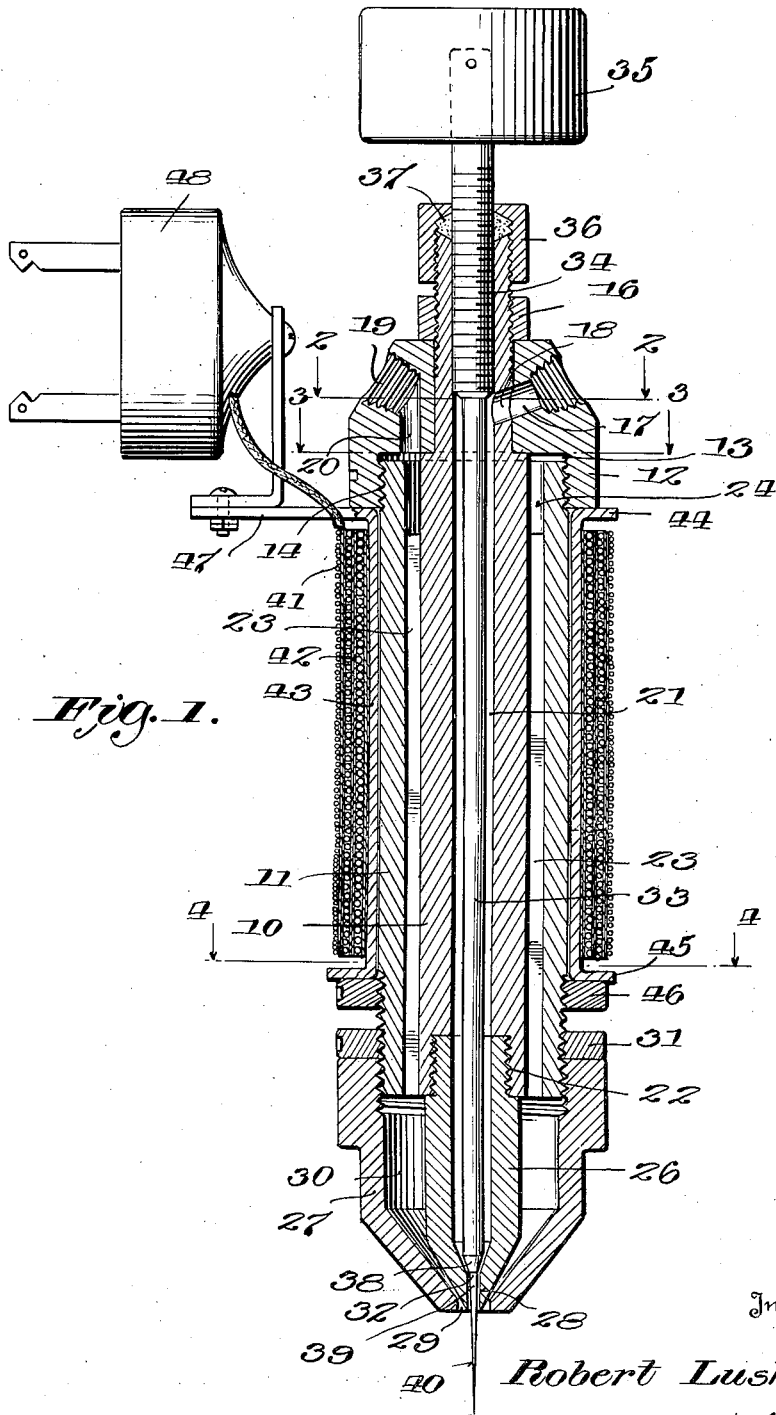

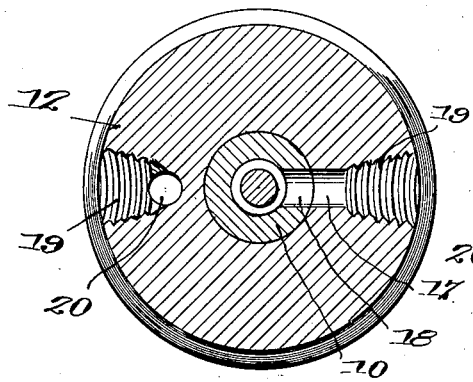
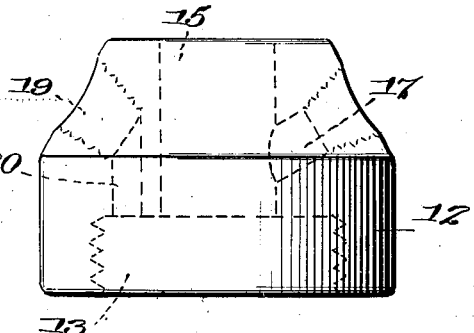
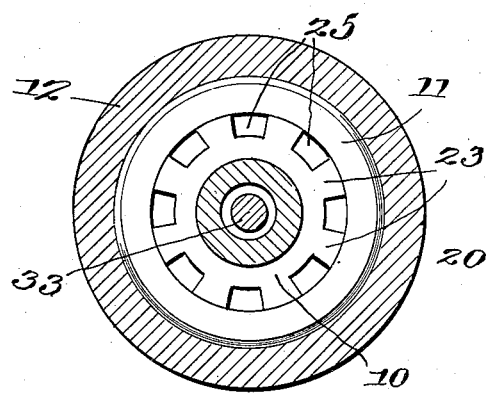
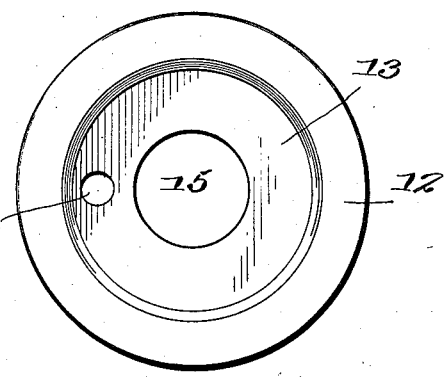
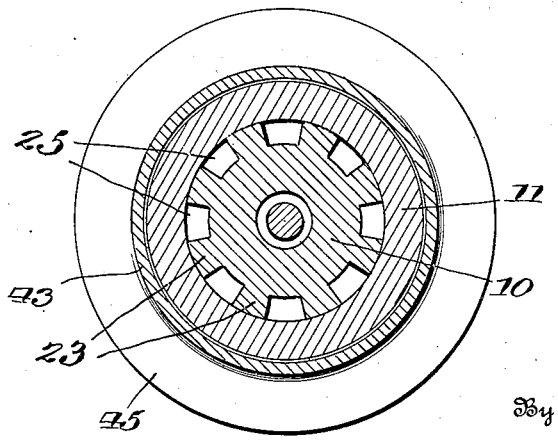

1,779,849

UNITED STATES PATENT OFFICE

ROBERT LUSK, OF PALMS, CALIFORNIA, ASSIGNOR TO BROGDEX COMPANY, OF WINTER HAVEN, FLORIDA, A CORPORATION OF FLORIDA

ATOMIZING AND SPRAYING DEVICE

Application filed May 17, 1924. Serial No. 714,137.

This invention relates to an atomizing and spraying device; and more particularly to such a device of the air-brush type in which air under pressure is used to atomize a liquid or other substance in fluent condition and project the same in the form of a fine spray onto a surface or object to be sprayed or coated therewith.

A general object of the invention is to provide an atomizing and spraying device which, while possessing certain advantages over prior art devices in the atomizing and spraying of liquids generally, is especially adapted for use as an air-brush in the spraying of coating materials, and more particularly coating material containing a wax or wax-like substance.

A most important field of usefulness of the invention is found in the treatment of fresh fruit to provide the same with a film-like protective coating of such character as to enhance its keeping qualities, an important feature of such treatment being an initial application to the surface of the fruit of a fluid treating material, generally comprising paraffin associated with a liquid vehicle or a solvent therefor, followed by a rubbing of the fruit to uniformly distribute the applied material thereover in a polished and film-like coating. It has been found that in such treatment of fruit, especially where the treating composition comprises paraffin associated with a liquid vehicle or solvent therefor, the composition can be most effectively and satisfactorily applied to the fruit by a device of the air-brush type, a device of that type enabling such a control of the shape or configuration of the projected stream of the composition as to increase the accuracy and uniformity with which the material can be applied to the fruit.

It has also been found in practice, however, that the prior art atomizing and spraying devices, including those of the air brush type, are not altogether adapted for spraying such fluent coating material as that described above as used in the treatment of fruit, and that in fact the prior art devices present features of construction seriously detracting from their usefulness for such purpose.

Among the objectionable features found generally in the prior art devices are the provision for spraying only under high pressure air or other gaseous medium and the relatively restricted passages and exit orifices for the flow of the gaseous medium and of the material to be sprayed. Because of the tendency of paraffin and other waxy substances to congeal and separate out of even fairly dilute solutions when under substantial pressure, it is a difficult matter to force liquid compositions containing such substances through the relatively restricted passages and exit-orifices characterizing ordinary spray devices, and in any substantially extended run of operations, clogging of the spray device by the congealed and separated paraffin or the like generally occurs.

Under some conditions of operation, in the spraying of a fluent material containing paraffin or other wax or wax-like substance, it is advantageous to maintain the fluent material in a uniformly heated state during its flow through the spray device. In the prior art atomizing and spraying devices, where provision has been made for heating the material to be sprayed, it has customarily been by employing steam or pre-heated air at high pressure as the heating as well as the atomizing and spraying medium. Both steam and preheated air at high pressure, are, however, objectionable as the heating medium in the spraying of fluent coating material containing paraffin or the like, due to their tendency to spread or dissipate the projected material in fog-like form beyond the limits of the surface to be coated, the steam also causing a spotting of the coating actually produced. Moreover, neither steam nor air as the heating agency produces the required uniformity of heat, due to substantial drops in temperature of the medium in its traverse of the passages in the spray device to the nozzle outlet, such lowering of the temperature tending in some cases to cause solidification of the waxy content of the fluent coating composition, especially adjacent and within the spray nozzle.

Accordingly, particular objects of my invention are to provide an atomizing and spraying device of the air-brush type designed with respect to the passages and exit orifices for the spraying medium and the material to be sprayed and with respect to the means for heating the material, to avoid the objectionable features of the prior art devices mentioned above, and adapted to properly spray or project fluent coating material under relatively low pressure of the spraying medium, without dissipation of the material beyond the intended limits, and without clogging of the device.

My invention contemplates the arrangement of all internal passages of the novel atomizing and spraying device or air-brush in straight line directions continuous toward the spray nozzle and exit orifices so as to avoid angles or pockets not directed toward or opening toward the exit orifices, this arrangement providing for an unobstructed flow with a minimum of head or pressure of the spray medium and the fluent material to be sprayed. Air, under low pressure, is preferably used as the spraying medium, and the ducts or passageways for both the air and the fluent material to be sprayed are of relatively large capacity to provide chambers for a substantial supply of the same immediately adjacent the exit orifices of the spray nozzle and a free flow thereto. My invention further contemplates the provision of means arranged in the spray nozzle and automatically movably operating under the influence of the outflowing air or other spraying medium to maintain the nozzle clear of clogging particles either of the fluent material or of foreign matter.

My invention further contemplates means for supplying from a source other than the spraying medium itself a uniform degree of heat to the fluent material within the spray device as well as to the spraying medium. In a desirable embodiment of the invention, the heating agency is applied directly to the exterior of the spray device itself, that device being then constructed of heat conducting material such as brass or bronze, and having an interior arrangement of parts facilitating the conduction of the heat to the fluent coating material and also with substantial uniformity to all parts of the device, including the spray nozzle. Such extensive and uniform conduction of the heat is of considerable advantage in that it maintains substantially uniform conditions of temperature throughout the entire flow of the fluent coating material in the spray device.

The objects and principles of my invention, including the foregoing objects and principles, will be more fully set forth in the description, and accompanying drawings forming a part of this specification, of a preferred specific embodiment thereof. It is to be understood, however, that the specific embodiment referred to is merely illustrative of the invention and that various changes and modifications and other embodiments are within the scope of the invention as defined in the appended claims.

In the drawings:

Fig. 1 is a longitudinal sectional view of an atomizing and spray device of the air-brush type embodying the invention;

Fig. 2 is a transverse sectional view through the supply head of the device on the line 2—2 of Fig. 1, Fig. 2 as well as the remaining Figs. 3 to 4 inclusive, being on an enlarged scale;

Fig. 3 is a transverse sectional view on the line 3—3 of Fig. 1;

Fig. 4 is a transverse sectional view on the line 4—4 of Fig. 1;

Fig. 5 is a side elevational view of the supply head of the device, with the interior passages thereof shown in dotted lines; and Fig. 6 is a bottom plan view of the supply head shown in Fig. 5.

As hereinbefore stated, the novel atomizing and spraying device is especially adapted for use as an air brush in projecting coating material upon a surface or object to be coated, and more particularly for the projection of fluent coating compositions containing paraffin or the like. While the novel device is by no means confined to the uses mentioned, its particular use as an air brush in projecting fluent coating compositions containing paraffin or other waxy substances for the coating of fruit or any other article, aptly presents the advantageous features of the device, and for the sake of brevity the following description will be confined to that particular use.

The illustrative embodiment of the novel atomizing and spraying device or air-brush comprises a main body portion with a spray nozzle at one end and a supply head at the other. The main body portion consists of two cylindrical tubular members 10 and 11, removably and separately mounted in the supply head 12, with the members 10 and 11 concentrically arranged to provide open ended passages or chambers of relatively large capacity for the maintenance of a relatively large body of the fluent coating material and the spraying medium immediately adjacent the spray nozzle for immediate flow therethrough.

The supply head 12 is of cap-like formation, as shown in Figs. 1, 5 and 6, having a lower interior recess 13, screw threaded to engage the threaded end portion 14 of the outer cylindrical member 11 for the removable mounting of that member in the head. The supply head is centrally bored, as indicated at 15, for the reception therethrough of the upwardly extending end portion of the inner cylindrical member 10, that member being removably secured in the head by the retaining nut 16 engaging its protruding and threaded upper end portion. As shown particularly in Fig. 1, this upper end portion of the member 10 is reduced in overall diameter to fit the bore in the head 12, the shoulder formed by the reduction in diameter engaging the upper wall of the recessed portion of the head when the retaining nut 16 is tightened to secure the mounting of the member 10 in the head.

Supply ducts or passages are drilled in the head or cap 12 for supplying fluent coating material and air under pressure to the passages or chambers formed by the body members 10 and 11. The upper portion of the head 12 is truncated as shown to form inwardly inclined or tapering sides and a flat top. The supply duct or passage 17 for the fluent coating material extends obliquely inward and downward from the outer inclined face of the head 12 to the central bore 15 of the head, as shown more particularly in Figs. 1 and 5, the central tubular member 10 being provided with a port 18 in its upper portion to register with the passage 17 in the assembled positions of the parts shown in Fig. 1. The supply duct for air under pressure extends from the opposite side of the inclined face of the head 12 first obliquely downward as indicated at 19 and then downward in a straight line to one side of the bore 15 to the recess 13 of the head, as indicated at 20, in position supplying the compressed air to the outer passage or chamber formed between the concentric cylindrical members 10 and 11.

In the illustrative embodiment of the invention, a heating appliance is mounted about the main body portion of the air brush, and in order to conduct the heat rapidly and with substantial uniformity to the fluent coating material in the central passage or chamber 21 of the cylindrical member 10 and throughout all parts of the air brush, the latter is made of a suitable heat conducting material such as brass or bronze, and of an interior arrangement of contacting metal parts facilitating such conduction of heat. The outer member 11 is preferably, and as shown, of plain cylindrical form having interior and exterior walls of uniform diameter throughout, except of course for the outer threaded end portions for connection thereto of the supply head at one end and the air nozzle at the other. The inner member 10 has an interior cylindrical wall surface of uniform diameter except for an interiorly threaded countersunk portion 22 at its lower end for the attachment of the fluent-material nozzle, but its outer wall surface is fluted to provide longitudinally extending ribs 23 in spaced relation circumferentially of the member 10. The ribs are of an outward extension providing a close sliding fit of the member 10 within the member 11 for the assembling and disassembling of these parts, and with the ribs in substantial contact with the interior wall of the member 11 in the assembled position of the parts as shown in Figs. 1, 3 and 4. The ribs, it is obvious, provide a heat conducting connection between the otherwise spaced outer and inner body members 10 and 11.

The heat-conducting ribs 23 extend longitudinally on the outer wall of the inner member 10, as stated, from the lower end of that member, but they terminate short of the upper end of outer member 11, in the assembled position of the parts as shown in Fig 1, that arrangement providing an upper annular air chamber 24 between the opposed cylindrical walls of the members 10 and 11 and a circumferential series of air passages or chambers 25 communicating with the air chamber 24 and extending each in straight and unbroken lines to the air nozzle below.

The spray nozzle as a whole, consists of two concentric nozzles, an inner nozzle 26 for the fluent coating material and an outer air nozzle 27. The inner nozzle 26 has a main body portion cylindrical in form with a bore of the diameter of the bore 21 of the central body member 10, the upper end of the nozzle being reduced in outside diameter and threaded to engage the interior threads of the countersunk portion 22 of the member 10 for its detachable mounting on that member. When thus mounted, the bore of the nozzle provides in substantial effect a smooth and unbroken continuation of the interior cylindrical wall surface of the member 10. The outer end of the nozzle 26 is tapered both inside and outside as shown in Fig. 1, the inner tapering wall extending to the outlet orifice 28 and the outer tapering wall cooperating with the outer nozzle 27 in forming the air-outlet orifice 29.

The outer or air nozzle 27 provides, as shown in Fig. 1, a relatively large air chamber 30 immediately adjacent the air-outlet, and this air nozzle is interiorly threaded for its adjustable mounting upon the exteriorly threaded end portion of the outer body member 11 as shown, a lock-nut 31 securing the nozzle in its adjusted mounting.

The quantity-flow of the material to be sprayed is adjustably controlled by a needle valve 32 having an elongated stem 33 extending through the bore 21 of the central body member 10. The stem 33 of the needle valve is provided with an enlarged threaded end portion 34 engaging the threaded interior wall of the upper end portion of the member 10 for the support and adjustment of the needle valve, the outer end of the needle valve stem being provided with a knob 35 for effecting the adjustment by turning the valve stem. A packing nut 36 containing asbestos or other suitable packing 37 is disposed about the protruding upper end portion of the valve stem in screw threaded engagement with the outer threaded portion of the body member 10, as shown in Fig. 1.

The needle valve is formed with a head portion 38 of relatively sharp angle of taper, located within the center nozzle 26, and with a body portion 39 of less inclination of taper extending through the relatively long and untapered bore forming the outlet orifice 28, these two parts of the needle valve providing, upon inward and outward adjusting movement, the required adjustable control of the quantity flow of the coating material through the nozzle, and the head portion, upon outward movement of the valve, providing for the complete shut-off of the flow.

As hereinbefore stated, my invention contemplates the provision of means automatically operating under the influence of the outflowing air or other spraying medium to maintain the nozzle clear of clogging particles in the fluent material. In the illustrative embodiment of my invention, the means referred to comprises such an attenuated prolongation of the needle valve beyond the outlet orifice for the fluent coating material as to be set in rapid motion by the outflowing air and fluent coating material, the result being a rapid vibratory or circular movement of the needle valve within the nozzle barely perceptible but sufficient to prevent clogging. In practice, I have found that a tapered prolongation of the needle valve to a sharp point, approximately two and one half times the length of the outlet passage or bore forming the orifice of the nozzle, gives very satisfactory results, and such a prolongation of the needle valve is indicated by the numeral 40 in Fig. 1. It is to be understood, however, that the extent of the projecting portion of the needle valve here given is not to be considered as restrictive.

It will be noted from the arrangement of parts shown in Fig. 1, that the air nozzle is tapered to a greater degree than the material nozzle, and that the outlet orifice of the air nozzle is of such diameter as to extend the tip of the material nozzle substantially therethrough in the adjusted position of the air nozzle shown in Fig. 1, and that a forward adjustment of the air nozzle increases the quantity outflow of air. The relative arrangement of the two nozzles, and particularly the taper of the air nozzle toward the material nozzle, provides that direction of flow of the air against the extended end portion of the needle valve facilitating its clearing movements referred to, and also insures the projection of the coating material in a restricted stream without fog, results of substantial importance in the spraying of fluent coating compositions containing paraffin or the like which exhibit a tendency to clog the spraying nozzle and to dispersion of the spray. In practice, I have found that in the projection of a paraffin-containing material, and particularly where the projection is to be confined within relatively narrow limits as in the coating of fruit, a taper of 60 degrees for the inner and outer walls of the material nozzle and of 75 degrees for the air nozzle, and with relatively large and straight sided outlet passages in the nozzles, as shown in Fig. 1, produce the most satisfactory results in the avoidance of clogs in the nozzle and of fog in the projection of the material. Obviously the size of the nozzle outlet passages or orifices and the relative degrees of taper of the nozzles may be varied for liquids or fluent coating materials of differing characteristics.

The heating device hereinbefore referred to as mounted about the central body portion of the air-brush is preferably an electric heating appliance. In the illustrative embodiment of the invention this appliance comprises an electric heating element, consisting of resistance coils 41, with layers of insulation 42, wound upon a flanged foundation sleeve 43 adapted to be slid over the outer cylindrical surface of the body member 11 to the position shown in Fig. 1 in the assembly of the air-brush. The sleeve 43 has an upper annular flange 44 engaging beneath and against the lower rim of the head 12 and a lower flange 45, against which a lock nut 46, upon the lower exteriorly threaded end portion of the body member 11, engages to support the heater in its mounted position about the body member 11. An arm 47, extending laterally from the upper flange 44, serves as a bracket for the support of a connecting element 48 for the current supply leads.

In that particular use of the novel atomizing and spraying device or air-brush hereinbefore stated as most aptly presenting its advantageous features, the paraffin-containing composition is delivered from its supply tank through the usual valve controlled pipes to the supply duct 17 in the air-brush head, and air under relatively low plus pressure is delivered to the air supply duct 19, the air pressure being regulated by the usual needle valve or pressure regulator not shown. It will be noted that all passages throughout the device are directed either in straight lines or at an inclination toward the nozzles, including the initial supply ducts 17 and 19. This arrangement avoids pockets or angles not opening toward the nozzles, a feature of substantial importance particularly in providing a continuous flow of the paraffin-containing fluent material and always in a direction toward the material nozzle, thus avoiding separation of the paraffin from the flowing stream which is very apt to occur where the course of flow is interrupted, retarded or abruptly changed in direction.

It is further to be noted that the bores of the central body member 10 and the material nozzle 26 provide a straight and unbroken passageway of large capacity for the flow of the paraffin-containing material directly to the nozzle outlet. The surrounding air passages are also of relatively large capacity, terminating in the enlarged air chamber formed between the walls of the air nozzle 27 and the material nozzle 26, this arrangement providing for an abundant supply of the air for spraying immediately adjacent the air nozzle outlet and enabling effective operation under a relatively low plus pressure, thus avoiding dispersion of the material in the form of fog which is apt to occur under high pressure of the issuing air.

Another important feature of the device is its construction in separable parts enabling their ready assembly and disassembly and with all passages extending entirely through each part and completely exposed on disassembly for access in cleaning.

What I claim is:

1. A spraying or atomizing device comprising, in combination, a nozzle for a non-gaseous fluent material to be sprayed or atomized, means for supplying a non-gaseous fluent material under pressure to said nozzle, movable clearer means projecting through said nozzle operable in continuous movement by impingement thereagainst of an outflowing gaseous medium to maintain a clear passage through said nozzle, and supply means, separate from said first mentioned supply means, for projecting a gaseous medium under pressure against said clearer means exteriorly of said nozzle for said operation of said clearer means.

2. A spraying or atomizing device comprising, in combination, a nozzle for a non-gaseous fluent material to be sprayed or atomized, means arranged for supplying the non-gaseous fluent material under pressure to said nozzle, vibratory clearer means arranged in said nozzle operable by impingement thereagainst of an outflowing gaseous medium to maintain a clear passage through said nozzle, and supply means, separate from said first mentioned supply means, directing a gaseous medium under pressure into impinging relation with said clearer means for its said operation and into the path of said non-gaseous fluent material to atomize the same.

3. A spraying or atomizing device comprising, in combination, a nozzle having an outlet passageway for fluent coating material and an annular outlet passageway surrounding said first mentioned passageway, for a gaseous medium under pressure, a movable member mounted to extend through said first mentioned passageway and adapted to be movably actuated by the pressure of said gaseous medium passing through said second mentioned passageway for dislodging particles of fluent coating material in said first mentioned passageway.

4. A spraying or atomizing device comprising, in combination, a nozzle having an outlet passageway for fluent coating material and an annular outlet passageway for a gaseous medium under pressure, said second mentioned passageway surrounding and converging toward said first mentioned passageway, a needle valve mounted to extend within said first mentioned passageway, said needle valve having an attenuated extension beyond said first mentioned passageway into the path of the gaseous medium issuing from said second mentioned passageway and adapted to be set in vibration by impingement of said gaseous medium on said extension.

5. An air brush for applying fluent coating material, comprising, in combination, a central body portion having an axial passageway and a plurality of passageways disposed thereabout, all said passageways extending in continuous straight lines longitudinally through said body portion to opposite open ends, heating means surrounding said body portion, two concentric nozzles removably mounted on one end of said body portion, the inner one over the adjacent open end of said axial passageway and the outer one over the adjacent open ends of said plurality of passageways, said nozzles cooperating to form a chamber into which said plurality of passageways lead and which has an unobstructed annular outlet and a supply head removably attached to the opposite end of said body portion and having two separate supply passageways, one communicating with said axial passageway and the other with said plurality of passageways for the supply of the fluent coating material and a gaseous medium under pressure thereto in directions wholly oblique to the axial line of the brush.

6. An atomizing or spraying device formed of separable and assembled parts, said device comprising, in combination, a supply head having two supply passageways, two separate tubular members detachably secured to said head in assembly extending from said head in concentric relation one within the other, the inner of said tubular members having a bore forming a central passageway in said device of circular cross section and uniform diameter throughout, said central passageway communicating with one of said supply passageways, said tubular members being cooperatively arranged in said assembly to form between them a second passageway in said device communicating with the other of said supply passageways, a central nozzle detachably mounted on the end of said inner tubular member opposite said head and communicating with said central passageway, and an outer concentric nozzle detachably mounted on the adjacent end of said outer tubular member and communicating with said second passageway, all of said passageways in said head and tubular members extending entirely therethrough and in directions toward said nozzles in the assembled position of the parts of said device.

7. An air brush for applying fluent coating material containing a waxy constituent comprising, in combination, a body portion having a chamber for the coating material and a nozzle discharge orifice in said chamber and an adjacent chamber for the gaseous medium under pressure having a discharge orifice directing said gaseous medium into atomizing relation with said nozzle discharge orifice, a removable sleeve fitting around said body portion and a heating unit carried thereby.

8. An air brush for applying fluent coating material comprising, in combination, concentric inner and outer cylindrical tubular members, the inner member forming a chamber for fluent coating material and the outer member forming an air jacket about the inner member, a nozzle mounted on one end of the inner member and supplied with fluent coating material from said chamber, an air nozzle mounted on the adjacent end of said air jacket and supplied with air therefrom, and an electric heater about said air jacket, a face of one of said cylindrical tubular members opposed to the other cylindrical tubular member being provided with heat conducting elements projecting from said face into contact with the opposed surface of said other tubular member.

9. An air brush for applying fluent coating material formed of assembled and separable parts, comprising, in combination, a head having supply passages for fluent coating material and air under pressure, a cylindrical tubular member removably mounted in said head in communication with said supply passage for fluent coating material, said tubular member having its outer surface fluted to form longitudinally extended ribs, an air jacket fitting over said ribs in slidable contact therewith in assembling said air brush and detachably secured in assembled position on said head, a central nozzle detachably mounted on the end of said tubular member opposite said head, a second nozzle detachably mounted on the adjacent end of said air jacket and about said first mentioned nozzle, and a tubular electric heating appliance comprising a metal jacket with a heating coil thereabout mounted on said air jacket and slidably fitting thereover in assembling said air brush.

10. A spraying or atomizing device comprising, in combination, two concentric nozzles, the inner for a liquid, the outer for a gas under pressure, the outlet orifices of each nozzle having straight parallel side walls throughout their entire length, and a valve arranged in the liquid nozzle having a vibratory tapering extension within the orifice of said liquid nozzle to maintain a clear passage therethrough by pressure of the gas thereagainst as said gas issues from the nozzle.

11. A spraying or atomizing device comprising, in combination, two concentric nozzles, the inner for a liquid, the outer for a gas under pressure, the angles of convergence of the two differing in such a way that an appreciably enlarged annular air space is formed around the liquid nozzle, a needle valve mounted to extend within the liquid orifice, said valve having mounted upon it an attenuated extension projecting into the path of outflowing gas and adapted to be put in vibration by said outflow.

12. A spraying and atomizing device comprising in combination a metallic nozzle having at one end a central liquid discharge orifice, an annular inwardly directed gaseous fluid discharge orifice concentrically arranged therearound, and liquid and gaseous fluid passages extending through the body of said nozzle to said orifices, and electrical heating means around the body of the nozzle, a large part of the cross-section of the body portion covered by said heating means being solid metal from the liquid passage radially outwards to said heating means to allow ready transfer of heat from the latter to the liquid flowing through said liquid passage.

13. A spraying or atomizing device as in claim 12 in which the nozzle is formed with an annular chamber at the rear of the gaseous fluid discharge orifice adapted to distribute the flow of gaseous fluid from the passage therefor through the body of the nozzle substantially uniformly around said annular discharge orifice.

14. A spraying or atomizing device comprising in combination a metallic nozzle comprising a body portion having at one end a central liquid discharge orifice, an annular inwardly directed gaseous fluid discharge orifice concentrically arranged therearound and a longitudinal central passage through the body of the nozzle for the flow of liquid therethrough, electrical heating means around one section of the body of the nozzle, annular gaseous fluid chambers within said body on either side of said heating means and concentrically surrounding the central liquid passage, a connection from a source of gaseous flow to one annular chamber, said other annular chamber being directly connected to the gaseous fluid discharge orifice, said body also having a plurality of passages connecting said annular chambers and spaced apart substantially symmetrically around said central passage.

15. In a spraying or atomizing device, a nozzle comprising cooperating liquid and gas discharge outlets, a clearer member laterally movable within said liquid discharge outlet and having an actuating portion disposed in the path of discharge from said gas discharge outlet, impingement of the discharged gas upon said portion causing lateral movement of said clearer member when the nozzle is in operation.

16. In a spraying or atomizing device, a nozzle comprising an inner tubular member providing a central fluid passage terminating in a discharge outlet and provided internally with a valve seat, an outer tubular member cooperating with said inner member to provide a fluid passage surrounding the first and terminating in an annular discharge outlet formed to direct fluid convergently upon the line of discharge from the central outlet, a longitudinally adjustable valve member arranged within said inner tubular member and having a portion cooperating with said valve seat to control flow of fluid through said central passage, and a vibratory clearer carried by said valve member extending through said central outlet and projecting therebeyond into the path of discharge from said annular discharge outlet in all operative positions of said valve member, said clearer member being movable laterally within said central discharge outlet and being vibratable by impingement of fluid discharged against it from said annular discharge outlet.

17. In a spraying or atomizing device, a nozzle comprising a central liquid discharge outlet, an annular gaseous fluid discharge outlet coaxial therewith and arranged to direct its discharge convergently upon the common axis, and a flexible clearer member extending axially through said central outlet and capable of lateral movement therewithin, said clearer member projecting beyond said central outlet into the path of discharge from said annular outlet and being laterally vibratable by impingement of fluid discharged therefrom while the nozzle is in operation.

In testimony whereof I hereunto affix my signature.

ROBERT LUSK.